Sept. 23, 1941.   W. TUTTLE   2,256,694
LATHER FOUNT
Filed Aug. 29, 1939   2 Sheets-Sheet 1
Fig. 1.
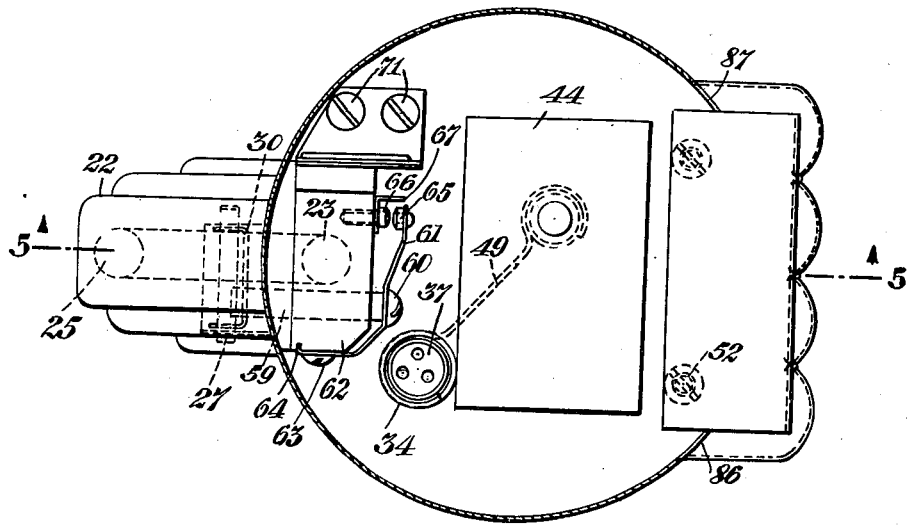
Fig. 2.
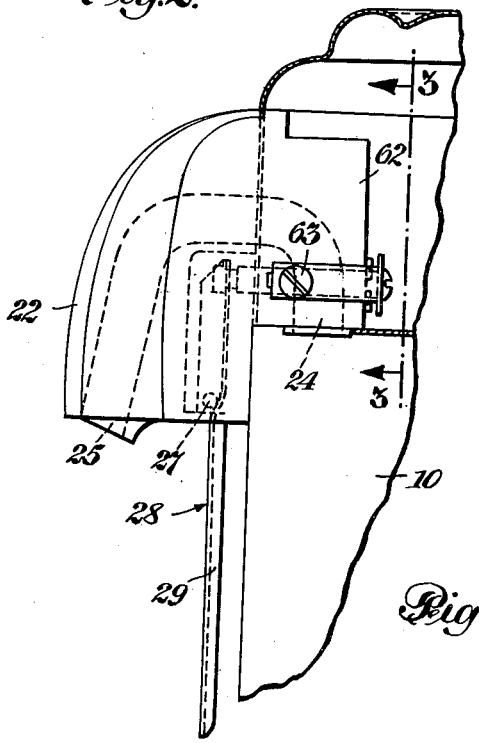
Fig. 3.
Fig. 4.
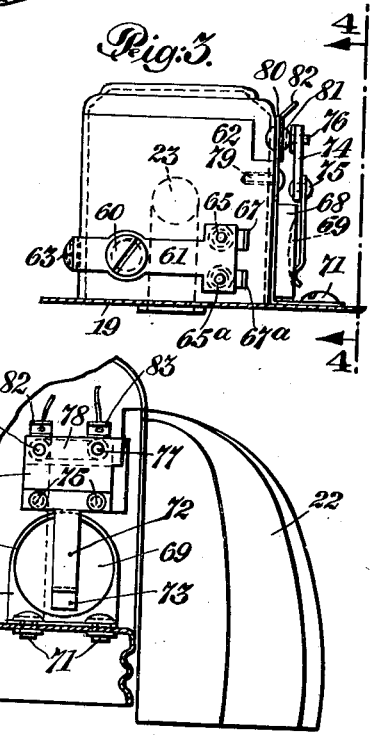
INVENTOR
Wainwright Tuttle
BY
Van Deventer + Grier
ATTORNEYS Sept. 23, 1941.    W. TUTTLE    2,256,694
LATHER FOUNT
Filed Aug. 29, 1939    2 Sheets-Sheet 2
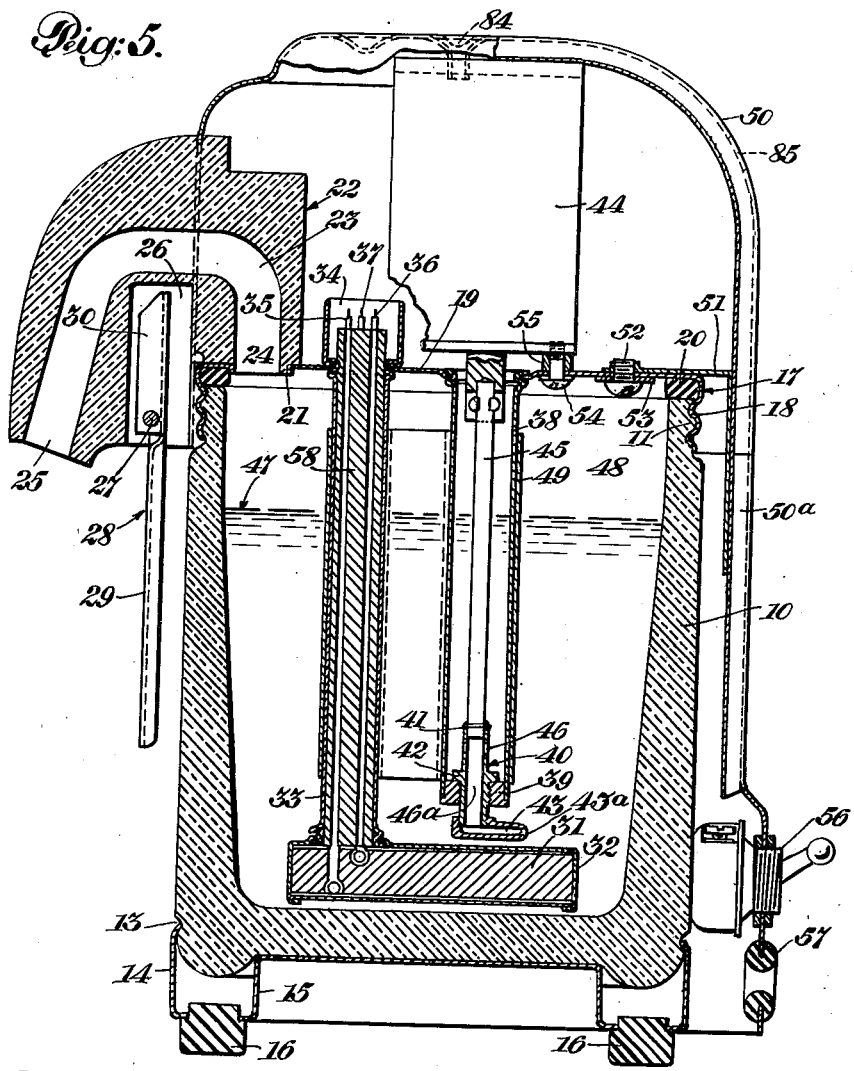
INVENTOR
Wainwright Tuttle
BY
Van Deventer & Grier
ATTORNEYS Patented Sept. 23, 1941

2,256,694

UNITED STATES PATENT OFFICE 2,256,694

LATHER FOUNT

Wainwright Tuttle, Bridgeport, Conn.

Application August 29, 1939, Serial No. 292,379

16 Claims. (Cl. 261—93)

This invention relates to improvements in lather founts and has for an object the provision of a fully automatic lather fount or dispenser which will generate and deliver warm lather to the operator.

Another object of the invention is the provision of a lather fount including a nozzle and a switch plate adjacent thereto whereby a person may place his hand under the nozzle and in contact with the switch plate, whereupon the machine will deliver warm lather into the hand as long as the switch plate is actuated.

A further object of the invention is the provision of a lather fount including a thermostatically controlled heating device within the liquid in said fount and a motor driven agitator generating a foam or lather within said fount, means being provided to prevent foam or liquid from coming in contact with said motor or the electrical connection to the heating means.

Still another object of the invention is the provision in a lather fount of a heating unit in heat transfer relation to the liquid therein adapted to consume current at a high wattage rate until said liquid obtains a predetermined temperature, whereupon thermostatic means causes a substantial reduction in the wattage consumption of said unit.

Another object of the invention is the provision in a lather dispensing device of means to deliver lather to the hand automatically from a nozzle formed in said dispenser, said means also being adapted to retract the lather within the length of said nozzle at the end of each ejecting operation, thereby preventing lather from dripping from said nozzle.

Other objects and advantages of the invention will be apparent to those skilled in the art.

Referring to the drawings:

Figure 1 is a plan view, partly in section, of the new and improved lather dispenser;

Figure 2 is a fragmentary elevation showing the arrangement of the ejecting nozzle and the hand plate for switching the motor off and on;

Figure 3 is an elevation of the switching mechanism taken along the line 3—3 of Figure 2;

Figure 4 is an elevation of the switching mechanism taken along the line 4—4 of Figure 3;

Figure 5 is a sectional elevation of the new and improved lather dispenser taken along the line 5—5 of Figure 1;

Figure 6 is a diagram showing the electrical circuits in said dispenser;

Figure 7 is a view showing a modified form of impeller; and

Figure 8 is a view, partly in section, showing a further modified form of impeller.

Referring now to Figure 5, a jar 10, which is preferably made of glass or other material easy to keep clean and sanitary, is open at the top, and is provided with threads 11 adjacent to the top. Near the bottom of the jar is an annular groove 13 which may be engaged by the inwardly turned rim of the base 14. A depression is formed in the bottom of the jar 10 and is engaged by an upstanding portion 15 of the base. Suitable rubber feet 16 are provided in the base to insulate it from the surface upon which it rests, and to prevent it from skidding.

A cap member for the jar, generally designated by the numeral 17, is provided with threads 18 matching the threads 11, and a gasket 20 is provided for forming a seal between the cap 17 and the jar 10.

The upper surface or plate portion 19 of the cap member 17 has a hole formed therein through which an annular portion 21 of the nozzle member 22 extends. The nozzle member 22 has a U-shaped passage 23 formed therein, one end 24 of which communicates with the interior of the jar, and the other end 25 of which forms the discharge opening through which lather is dispensed.

A vertical recess 26 is formed in the body of the nozzle member 22 and carries a cross pin 27 which forms a pivotal support for a switch plate 28. The lower half of the switch plate is provided and is so positioned relative to the discharge opening 25 that when the user wishes lather, he places his hand under the discharge opening 25 with the edge of his finger against the lower end 29 of the switch plate. The upper end 30 of the switch plate is within the recess 26 and cooperates with members for effecting switching which will be presently described in connection with Figures 1 and 2.

The heating element 31 is encased in a watertight housing 32 lying horizontally near the bottom of the jar 10 when the device is assembled. This heating element is comprised of two heating sections 31a comprising a high wattage heating section, and 31b, a low wattage heating section. A vertical tubular shaft 33 has its lower end connected to the housing 32 and its upper end secured to the plate 19. A hole in the plate 19 provided for the purpose, accommodates the upper end of the tube 33. A suitable cup-shaped member 34 is secured in water-tight relation to the upper end of the tube 33 and is of such depth that it would be impossible for water from the jar to enter the cup and get into the interior of the tube 33.

Within the interior of the tube 33 are three conductors 35, 36 and 37 imbedded in suitable insulation 58, the lower ends of the wires being connected to the heating element 31 in the manner shown in Figure 6.

A second vertical tubular shaft or member 38 has its upper end sealed into a hole formed in the plate 19 for the purpose. The lower end of the tube 38 carries a bushing 39 which has a hole therein forming a bearing for the impeller member 40. The impeller member consists of a tubular portion 41 having a boss 42 forming a shoulder against the bushing 39 and carrying on its lower end an impeller element 43, having a small orifice 43a formed therein and providing communication between the interior of the impeller and liquid in the jar 10.

A motor 44 has a vertical extension shaft 45 extending downwardly in the tube 38 and the impeller member 40 is secured to the lower end of the shaft 45. The tubular portion of the impeller 40 within the tube 38 has a plurality of holes 46 communicating with the interior of the impeller element 43 and with the interior of the tube 38.

Assuming that the liquid level is at the point 47 it is obvious that when the motor is not operating the liquid level within the tube 38 will rise and become equal with the level of the liquid within the jar 10. Now as soon as the motor starts operating, driving the impeller, the centrifugal force of liquid leaving the impeller element 43 through the orifice 43a will create a partial vacuum within the tube 38 and the liquid within the tube 38 will pass out via the holes 46, the passage 46a within the tubular portion of the impeller and out into the main body of liquid via the impeller element 43. When the motor 44 ceases operating the liquid level within the tube 38 will rise until it reaches a plane with the liquid level 47, thereby creating within the glass jar 10 in the space 48 above the liquid level, a partial vacuum which causes any lather within the U-shaped discharge passage to be sucked back into the chamber 48, thereby preventing any dripping from the discharge nozzle 25.

The reinforcing member 49 partially embraces the tubular member 33 and partially embraces the tubular member 38, and is secured to the tubular members 33 and 38 to reinforce and brace these tubes. This relation may be clearly seen in Figure 1.

A suitable housing 50 forms an enclosure for the motor, thermostat and the switch and a portion of the nozzle member 22. This housing is supported by the plate 19, bracket means 51 being provided and having one leg secured to the skirt 50a and the other leg secured to the plate 19 by means of a screw 52 and a washer 53. The motor 44 is secured to the plate 19 by means of screws, one of which is designated by the numeral 54 and suitable spacing members such as the one shown at 55.

The skirt portion 50a of the cover 50 carries a main switch 56 for turning the heating element of the device on and making the motor ready to be energized when the switch plate 29 is actuated. A bushing 57 is provided through which a conductor cord may be passed. The upper end 30 of the switch plate moves to the left, as viewed in Figure 5, when its lower end 29 is pressed toward the jar 10. A rod 59 having one end thereof loosely secured to the end portion 30 of the switch plate, will move to the left as viewed in Figure 1, when the lower end of the switch plate is pressed toward the jar as above described.

The head 60 formed on the rod 59 normally rests in contact with the spring 61. The rod 59 passes through a hole formed in the spring. The spring 61 is secured to a block of insulation 62 by means of a screw 63, and a turned down portion 64 of the spring 63 extends into a slot formed in the block of insulation, thereby locking and maintaining the spring 60 in its normal position. The spring 61 carries at its free end, parallel contact members 65, 65a.

The insulation block 62 carries a pair of contact screws 66, 66a in line with the contacts 65, 65a respectively and adapted to be contacted by the latter when the switch plate 28 is actuated. Suitable lugs 67, 67a are provided for making electrical connections to these contact screws.

The thermostat includes a disk 68 having a flexible surface 69 and containing expansible fluid medium. The disk is mounted on a bracket 70 and the bracket is secured to plate 19 by means of screws 71. A T-shaped member 72 has its lower end secured to the disk surface at the point 73. The top portion of the T is secured to an insulating plate 74 by means of rivets 75. The upper portion of the plate 74 carries contact points 76 and 77 connected together electrically by a strap 78.

An insulating plate 80 is secured to the block 62 by means of screws 79 and carries contact points, one of which is shown at 81 and adapted to be normally contacted by the contacts 76 and 77.

Lugs 82 and 83 are provided for making electrical connections to the contact members on the plate 80.

When the contents of the jar 10 heat up, the plate 19 also becomes heated and its heat is transmitted to the disk 68 via the bracket 70 and when a predetermined temperature has been reached, the surface 69 of disk 68 bulges outwardly, and due to the fact that the leg 72 of the T-shaped member is connected to the disk surface 69 below the center, this will cause the upper end of the insulation plate 74 to swing outwardly and snap the contacts 76 and 77 out of engagement with the contacts carried by the plate 80 (one of which is designated by the numeral 81) thereby cutting off the current passing directly to the high heating element 31a and placing the low heating element 31b in series therewith, the contacts above described as broken being bridged by the low heating unit 31b as shown in Figure 6.

A screw 84 is provided for securing the upper portion of the cover 50 to the motor 44. An intake conduit 85 is provided in the cover 50 so that air may pass into or out of the interior of the cover. The reinforcing member 49 above described, in addition to reinforcing and bracing the tubes 33 and 38, serves as a baffle to prevent the formation of a vortex, which would allow the impeller 43 to take air from inside of the jar and fail to dispense lather.

In using the device, the jar 10 is unscrewed from the cover portion 17 and is filled to within about an inch of the top (say up to the liquid level 47 in Figure 5) with a mixture of soap and water. This soap can be shaving cream, powdered shaving soap or chipped shaving soap. The jar is then screwed back in place and the switch 56 is thrown to the "on" position, and immediately energy is supplied to the 200 watt immersion heating unit 31a. The thermostatic switch being at room temperature, is normally closed, so that the 20 watt heating element 31b is short circuited by the thermostat and is inoperative.

In the present embodiment, the contents will take about five minutes to heat up to a temperature of approximately 120° F. whereupon the thermostate snaps out, breaking contact between the contacts and throwing the heating element 31b in series with the heating element 31a and cutting the current consumption to approximately 20 watts, this being sufficient to hold the temperature of the mixture in the neighborhood of 120° F., and thereafter the machine is ready for operation.

When it is desired to obtain lather, the hand is placed under the discharge opening 25 to receive the lather, and the side of the hand presses the switch plate 29 inwardly and causes the contacts 65 and 66 to close, thereby energizing the motor 44. This causes the shaft 45 to rotate (a suitable universal joint being provided between the motor and the shaft) and the impeller 43 rotates rapidly in the mixture. The impeller 43 when it first starts rotating, ejects the liquid from the interior of the tube 38 in the manner hereinabove described, and when the tube is emptied of liquid the impeller injects air, which has entered the intake conduit 85 and is passed down the tube into the mixture.

This action occurs for the following three reasons:

1—due to the centrifugal force,
2—due to the reduction of static head due to velocity, and
3—cavitation of the liquid.

The air enters the liquid of the mixture amid violent agitation of the impeller, thereby forming very small bubbles which rise through the liquid and form foam or lather upon and above the surface of the liquid. The motion of the impeller has a tendency to, and does, rotate the liquid and foam within the jar in spite of the baffle plate 49, and this general motion of the liquid and the lather causes the lather to be further refined, as any big bubbles are thereby broken up.

Due to the fact that the only opening leading from the enclosed jar except the tube 38, is the discharge opening 25, the warm lather emerges from the jar, passing into the inlet passage 24 and out via the outlet opening 25 into the hand. For normal use, the new and improved fount may have the current turned on the heater all day long and turned off at night when the shop is closed. The low cost of the heat of the 20 watt element is continuously used instead of a thermostatically controlled "on-off" type. In using my heating arrangement, I do not have oozing of the foam from the spout due to expansion on the heating cycles, as would be the case with the thermostatically controlled heater. Under normal operation, when my fount is shut off for several hours or over night, the foam on the surface of the liquid will settle sufficiently to prevent oozing from the expansion on the initial quick heating of the 200 watt element, in fact in my device in normal use, each time lather is drawn from the device, that remaining within the passages 25, 24 is actually sucked back into the device due to the fact that when the motor stops running the liquid level in the tube rises and the liquid level in the jar per se falls to an even balance. Now the falling of the liquid level within the jar creates a partial vacuum within the area above the surface of the liquid which causes lather in the passages 24 and 25 to be sucked in. If the operator should fail to clean the discharge passages over a long period of time so that the passages become clogged, or if he placed his hand over the discharge passage 25 and then turned on the motor, a pressure would be built up in the jar, and when rotation of the impeller stopped, the accumulated pressure would force liquid up the tube 38 into the upper space within the cover but this would not do any damage to the device due to the fact that the cup 34 protects the terminals of the heating elements and the spacing members 55 associated with the motor space it from the upper surface of the screw cover 17 a sufficient distance to prevent the motor from being damaged. Such liquid will then flow down the back of the device via the openings or passages 86 and 87.

In the modification shown in Figure 7, the impeller may be formed of an annular hub 88 having a flange portion 87 membering up with the outside of the tube 38. It may have a plurality of impeller blades 90 and passages 91 having their lower ends adjacent to the impeller blades and having their upper ends communicating with the interior of the tube 38.

In a further modification, such as shown in Figure 8, the tube 38a which corresponds to the tube 38 shown in Figure 5, may be rotatably secured to the motor instead of to the plate 19, and an impeller blade 92 may be set into a diammetrical slot formed in the tube and so secured thereby providing a passage communicating with the interior of the tube 38a on each side of the blade, one of said passages being indicated by the numeral 93.

In respect to the term "centrifugal force" used above, it will be noted that there are two factors in the operation of my device which come under this head; first, the comparatively small effect of the centrifugal force of the air passing radially out of the small hole in the impeller from the hollow body of the impeller, and second, the whirling of the liquid in the vicinity of the impeller causes a reduction of pressure at the center of the whirl and due to this reduction in pressure, the air from within the tube flows into this area of low pressure and is broken into tiny bubbles due to the turbulence, and these bubbles rise away from the impeller to the surface of the body of liquid in a continuous process.

The above described device overcomes many difficulties previously encountered in connection with soaps and soap mixtures, by the elimination of screens, valves, brushes and other soap rubbing devices, stuffing boxes, check valves, close fits between working parts, small openings, pump cups or pistons, and the like: which clog up and affect the efficiency and reliability of the device; and which must necessarily be torn down and taken apart to be cleaned.

Due to the fact that my device is simple and employs so few moving parts, it is very easy to clean and keep sanitary.

The same principle herein disclosed may also be applied to the aerating of other liquids; for example, mixtures of milk and syrups or sugars might be aerated to form sillabub. Another convenient application would be in connection with the aeration of water in aquariums and the like, and many others.

Although I have described a preferred embodiment of the invention by way of example, and have shown two modifications of the impeller, it must be understood that many changes may be made in the arrangements herein shown and described without departing from the spirit of the invention as set forth in the following claims.

What is claimed is:

1. In a lather dispenser, a container adapted to be partially filled with a lather produceable liquid leaving a space above the surface of the liquid for lather, a closure for said container, a discharge nozzle having a discharge passage formed therein having one end communicating with said space and its other end accessible to a user, means for maintaining the temperature of said liquid above normal room temperature, a motor, an impeller driven by said motor and adapted to aerate said liquid and thereby produce lather, whereby it may float to the surface of the liquid and accumulate in said space, and switching means for said motor including a plate controllable by the hand of said user while said hand is positioned beneath said discharge nozzle, whereby any excess of lather generated will pass out of said space via said discharge passage and into said hand.

2. In a lather dispenser, a container adapted to be partially filled with a lather produceable liquid leaving a space above the surface of the liquid for lather, a closure for said container, a discharge nozzle carried on said closure, said nozzle having a discharge passage formed therein one end of which communicates with said space through said closure and the other end of which is accessible to the user, a motor carried on said closure, an aerating device at least partially submerged in said liquid, and a shaft extending vertically in said chamber and operatively connecting said aerating device to said motor, and switching means adapted to be moved laterally by the user's hand, while it is positioned under said discharge opening to receive lather, for operating said aerating device until a sufficient quantity of lather is discharged into the same.

3. In a lather dispenser, a container adapted to be partially filled with a saponaceous liquid leaving a space above the surface of the liquid for lather, a closure member for said container, a discharge nozzle supported on said closure member and having a discharge passage formed therein leading from said space to the outside, a motor supported on said member, an impeller submerged in said liquid, a shaft between the motor and said impeller, a tubular column supported on said member and carrying at its lower end a bearing for said impeller, and means forming a cavity in said impeller communicating with the interior of said column and communicating with said liquid and permitting some of said liquid to rise in said column to a common level with the liquid in said container outside of said column whereby, when said impeller is operated, the liquid in said column is first delivered to the main body of liquid after which air passes down the column in a continuous stream as long as the impeller operates, thereby aerating said liquid and forming lather, which passes out of said discharge opening after said space is filled with lather.

4. The invention according to claim 3 in which said closure member is maintained in sealed relation with said container, the only outlets being one for lather via said discharge nozzle and the other for liquid via the cavity in said impeller, whereby when the impeller ceases operating and the liquid rises in said column, a partial vacuum tends to form within said space, thereby causing the lather in said discharge passage to re-enter said space and preventing leakage of lather out of said discharge opening when the dispenser is not in use.

5. In a lather dispenser, a closed container adapted to be partially filled with a saponaceous liquid leaving a space above the surface of the liquid for lather, a discharge nozzle having a discharge passage formed therein leading from said space to the outside, means for aerating said liquid and producing an excess of lather in said space whereby lather may pass out of said dispenser via said discharge passage, and hydrostatic means including a hollow shaft extending down into said liquid from above and terminating in an opening associated with said means for aerating said liquid, the hollow in said shaft normally containing a column of said liquid which is displaced by air passing to the aerating means when the latter is operating, whereby when said last means ceases operating a partial vacuum is created in said container by liquid rising in said hollow thereby causing the lather remaining in said discharge passage to be returned to the body of lather in said space.

6. In a lather dispenser, a container adapted to be partially filled with a saponaceous liquid leaving a space above the surface of the liquid for lather, a closure member for said container, a discharge nozzle supported on the closure member and having a discharge passage formed therein leading from said space to the outside, a tubular column supported on said member and extending downwardly into the body of said liquid, an aerating member having a passage formed therein communicating with the interior of said tubular column, and means for rotating said aerating device, said aerating device being adapted to unbalance the liquid in said tubular column with respect to said body of liquid and thereafter to supply air to the liquid in said body to form an excess of lather in said space whereby lather is discharged from said nozzle, the hydrostatic action of said liquid in coming to a balance being adapted to withdraw into said space any lather remaining in said passage when the aerating process ceases.

7. A lather dispenser according to claim 3, in which a switch plate is pivotally mounted adjacent to said discharge passage so as to be actuated when the user's hand is beneath said discharge passage, and switch means operatively connected to said switch plate and included in a circuit with said motor.

8. A lather dispenser according to claim 3, in which a switch plate is pivotally carried by said discharge nozzle and in which switching means for controlling the operation of said motor is operatively connected to said switch plate.

9. In a lather dispenser, a container adapted to be partially filled with a saponaceous liquid leaving a space above the surface of the liquid for lather, a closure member for said container, a vertical column extending downwardly from said closure member, a fluid tight compartment substantially larger in cross-section than the cross-section of said column and secured to the bottom of said column in fluid-tight relation, heating means in said compartment having conductors therefrom extending up said column, means for connecting said conductors to a source of current for heating said liquid, a discharge nozzle forming an outlet between said space and the outside, and means for aerating said heated liquid to deliver lather to said space whereby an excess of lather will pass out via said discharge nozzle, said last means including a motor above the liquid, a vertical shaft extending therefrom to a point below the surface of said liquid and impeller means on the lower end of said shaft.

10. In a lather dispenser, a container including a saponaceous liquid and a space for lather, a closure member for said container, a discharge nozzle communicating with said lather space for delivering lather to the outside, a tubular column supported on said member and extending downwardly into the body of said liquid, aerating means carried at the lower end of said column, heating means submerged in said liquid and supported by said closure member, said heating means being adapted to heat said liquid and said aerating device being adapted to generate an excess of lather and deliver the same to said space whereby the excess lather may pass out from said chamber via said discharge nozzle.

11. In a lather dispenser, a container including a soapy liquid and a space for lather, a closure member for said container, a discharge nozzle communicating with said space for delivering lather to the exterior, a tubular column supported on said member and extending downwardly into the body of said liquid, an impeller carried at the lower end of said column, driving means for said impeller including a member extending through said column, heating means submerged in said liquid, a support for said heating means extending downwardly from said closure member said heating means being adapted to heat said liquid, and a baffle extending between said column and the support for said heating means to prevent a vortex from forming in said liquid when said impeller is operating.

12. In a lather dispenser, a container including a soapy liquid and a space for lather, a closure member for said container, a discharge nozzle communicating with said space for delivering lather to the exterior, a tubular column supported on said member and extending downwardly into the body of said liquid, an impeller carried at the lower end of said column, driving means for said impeller including a member extending through said column, heating means submerged in said liquid, a second vertical column forming a support for said heating means extending downwardly from said closure member, said heating means being adapted to heat said liquid, and a baffle secured to and extending between said columns for said heating means to prevent a vortex from forming in said liquid when said impeller is operating.

13. The invention according to claim 12, in which said second column forms a conduit for conductors leading to said heating means and in which a cup-shaped extension extends upwardly from said closure member to prevent liquid which may rise up said first column due to back pressure from wetting said conductors.

14. In a lather dispenser, a container adapted to be partially filled with a saponaceous liquid leaving a space above the surface of the liquid for lather, a closure member for said container, a discharge nozzle supported on said closure member and having a discharge passage formed therein leading from said space to the outside, a motor supported on said member, an impeller submerged in said liquid, a shaft between the motor and said impeller, a tubular column supported on said member and carrying at its lower end a bearing for said impeller, means forming a cavity in said impeller communicating with the interior of said column permitting some of said liquid to rise in said column to a common level with the liquid in said container outside of said column whereby, when said impeller is operated, the liquid in said column is first delivered to the main body of liquid after which air passes down the column in a continuous stream as long as the impeller operates, thereby aerating said liquid and forming lather, which passes out of said discharge opening after said space is filled with lather, a second tubular column supported on said member and carrying at its lower end in water-tight relation thereto a closure, a dual heating element in said closure, conductors leading up said second column and having their lower ends connected to said heating element, thermostatic means for reducing the heating rate of said element when a predetermined temperature is attained by said liquid, a cover partially enclosing said discharge nozzle and forming a chamber above said closure member, a hand operated switch plate, a switch controlled by said plate, and a main switch for controlling the delivery of current to said dispenser.

15. In a liquid aerating device, a container for said liquid, an impeller at least partially submerged in the liquid, a tubular column extending down into said liquid to form a support for a bearing for said impeller, the upper end of said column communicating with the atmosphere, means including a solid vertical shaft extending into said column and secured to said impeller for rotating said impeller, said impeller comprising a hollow body having liquid agitators thereon, means forming a passage in said body communicating with the interior of said column and terminating in the surface of at least one of said agitators, and means for leading air to the hollow within said body whereby aeration is effected by the combined effects of centrifugal force, reduction of static head, and cavitation of the liquid.

16. In a lather dispenser including a body of saponaceous fluid, a column extending from a point above said fluid to a point within the body of said fluid, a fluid tight chamber carried on the bottom of said column and including heating elements for heating said fluid, a second column also extending from a point above said fluid to a point within the body of said fluid, aerating means for said fluid supported in said second column and terminating adjacent to the bottom thereof, a baffle secured to said columns and extending downwardly into the body of said fluid to prevent the formation of a vortex therein, a motor for driving said aerating means, a circuit for energizing said heating means, a circuit for said motor, and manually controlled switching means included in said motor circuit for controlling the operation of said motor.

WAINWRIGHT TUTTLE.